L. L. LEASURE.
CUSHIONING DEVICE FOR USE ON CARS.
APPLICATION FILED SEPT. 13, 1911.
1,035,022.
Patented Aug. 6, 1912.
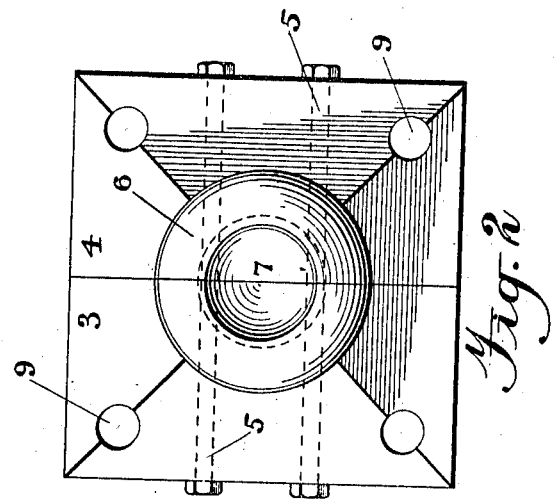
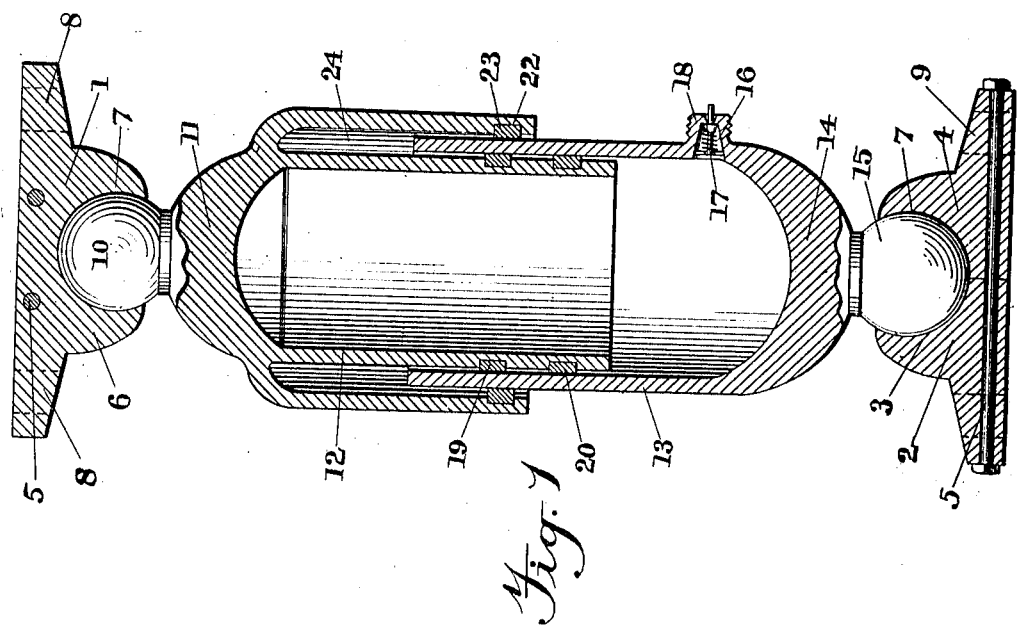
Witnesses
Alfred G. Sailer
James ——
Inventor
L. L. Leasure
By Victor J. Evans
Attorney

UNITED STATES PATENT OFFICE.

LAURENCE L. LEASURE, OF WINFIELD, KANSAS.

CUSHIONING DEVICE FOR USE ON CARS.

1,035,022.

Specification of Letters Patent. Patented Aug. 6, 1912.

Application filed September 13, 1911. Serial No. 649,011.

*To all whom it may concern:*

Be it known that I, LAURENCE L. LEASURE, a citizen of the United States, residing at Winfield, in the county of Cowley and State of Kansas, have invented new and useful Improvements in Cushioning Devices for Use on Cars, of which the following is a specification.

This invention relates to cushioning devices for use on cars, automobiles or like vehicles, and has for an object to provide means whereby the jars and shocks usually transmitted to the car when the latter is traveling over rough roads will be taken up by the device and thereby reduced to a minimum.

Another object of the invention is to provide relatively movable substantially cylindrical members which are adapted to contain an elastic fluid such as compressed air which, under its normal expansion, will hold the said cylindrical members distended and to provide gaskets on one of the members to bear against the interior and exterior surfaces of the other member so as to effect a perfect air tight connection between the members and to positively prevent the escape of the compressed air.

Another object of the invention is to provide attaching devices for the cylindrical members, whereby the device can be securely and operatively mounted upon the vehicle, the said attaching devices affording means for preventing strain on the cylindrical members when the vehicle is taking curves.

In the drawing, forming a portion of this specification and in which like numerals of reference indicate similar parts in the several views:—Figure 1 is a vertical longitudinal section through the cushioning device. Fig. 2 is a top plan view of one of the attaching brackets.

My improved cushioning device comprises the upper and lower attaching brackets 1 and 2 respectively, each comprising companion sections 3 and 4 which are detachably connected with each other by the fastening bolts 5. The companion sections 3 and 4 are provided on their undersides with castings 6 which form in their entirety a substantially spherical socket 7 for a purpose to be hereinafter described.

The bracket member 1 is provided with openings 8 to receive suitable bolts or other such equivalent fastening devices, whereby the member can be secured to the underside of the sill of the car. The bracket member 2 is provided with similar openings 9 which may also receive fastening devices for holding the bracket member to the truck of the car. In the socket 7 of the bracket member 1 is fitted a ball 10. This ball is formed on the head 11 of the cylinder section 12. The cylinder section 13 slidably receives the section 12, and as shown, the lower end of the section 13 has its head 14 provided with the ball 15 which is fitted in the socket 7 in the bracket member 2. The sections 12 and 13 respectively, define a continuous chamber A on an elastic or substantially buoyant element or fluid such as compressd air. For the purpose of introducing the fluid to the chamber, I provide the section 13 with a valve passage 16 in which is slidably mounted an inwardly opening check valve 17. The opening 16 is extended into an exteriorly threaded nipple 18 for attachment to a coupling or the like on the source of air supply, (not shown). The passage 16 is of an inwardly increased diameter so as to provide for the entrance of the air into the cylinder.

For the purpose of effecting a perfect air tight connection between the cylinder sections 12 and 13, I provide the inner walls of the section 12 with annular grooves 19 in which are fitted expansible packing rings 20 which are adapted to bear against the interior surfaces or walls of the section 13. The outer short walls 21 of the section 12 are provided with an annular groove 22 in which is fitted a packing 23. This packing is adapted to bear against the exterior surface of the walls of the section 13. The inner and outer walls of the section 12 are spaced from each other to define a longitudinal annular chamber 24 in which the open end of the cylinder section 13 is slidable. The ball and socket sections between the bracket members 1 and 2 and the respective cylinder sections of the device are such that the said cylinder sections are connected with the bracket members for universal movements to provide for the effective relative movements of the cylinder sections, regardless of the direction of movement of the body of the car with respect to the truck.

I claim:—

A cushioning device for vehicle comprising relatively movable upper and lower sections, said upper section having relatively spaced inner and outer walls forming a longitudinally extending annular chamber for the reception of the upper portion of the lower section, and said chamber being of a width greater than the thickness of the wall of the lower section permitting the sections to have slight lateral relative movements, said inner wall extending below the lower edge of the outer wall and provided in its outer surface with spaced annular grooves, one of said grooves being located at a point below and the other at a point above the lower edge of the outer wall, the inner side of the outer wall being provided with an annular groove having its upper wall located in a plane below the upper wall of said last named groove, and packing rings mounted in the grooves and adapted to engage the inner and outer sides of the lower section at different points, and projecting beyond the inner faces of the walls of the upper section so as to engage the lower section, said packing rings establishing an air-tight connection between the sections and normally maintaining them in proper longitudinal alinement.

In testimony whereof I affix my signature in presence of two witnesses.

LAURENCE L. LEASURE.

Witnesses:
GEO. H. HOUCK,
CHAS. E. CURRY.